(12) United States Patent
Rubinstein

(10) Patent No.: US 10,068,504 B2
(45) Date of Patent: Sep. 4, 2018

(54) TRIPLE SIGNS

(71) Applicant: Patrick Rubinstein, Paris (FR)

(72) Inventor: Patrick Rubinstein, Paris (FR)

( * ) Notice: Subject to any disclaimer, the term of this patent is extended or adjusted under 35 U.S.C. 154(b) by 50 days.

(21) Appl. No.: 15/281,898

(22) Filed: Sep. 30, 2016

(65) Prior Publication Data
US 2017/0098396 A1   Apr. 6, 2017

(30) Foreign Application Priority Data
Oct. 6, 2015 (FR) ...................... 15 02077

(51) Int. Cl.
| | | |
|---|---|---|
| *B32B 3/00* | (2006.01) | |
| *G09F 15/00* | (2006.01) | |
| *B32B 5/18* | (2006.01) | |
| *B32B 27/06* | (2006.01) | |
| *B32B 27/30* | (2006.01) | |
| *G09F 7/00* | (2006.01) | |
| *G09F 19/14* | (2006.01) | |

(52) U.S. Cl.
CPC ............ *G09F 15/0006* (2013.01); *B32B 5/18* (2013.01); *B32B 27/065* (2013.01); *B32B 27/302* (2013.01); *B32B 27/304* (2013.01); *G09F 7/00* (2013.01); *G09F 19/14* (2013.01); *B32B 2590/00* (2013.01)

(58) Field of Classification Search
CPC ................. Y10T 428/24174; G09F 19/14
See application file for complete search history.

(56) References Cited

U.S. PATENT DOCUMENTS

| | | |
|---|---|---|
| 922,015 A | 5/1909 | Miller |
| 1,967,658 A | 7/1934 | Buescher et al. |

FOREIGN PATENT DOCUMENTS

GB              1054          12/1913

OTHER PUBLICATIONS

French Search Report (FR 1502077) (2 pages—dated Apr. 15, 2016).

*Primary Examiner* — Alexander Thomas
(74) *Attorney, Agent, or Firm* — Renner, Kenner, Greive, Bobak, Taylor & Weber

(57) ABSTRACT

A device for presenting an image forming a triple display includes a base panel (1) made up of a rear or bottom plate (4) and a front plate (2) on which a central display is shown intended to be seen from head on to the base panel; and at least one lamella (10), preferably a plurality of lamellas, protruding from the front plate (2) and spaced apart from one another, each lamella (10) carrying on a left face a respective left sub-display and on a right face a respective right sub-display such that the left sub-displays in their entirety form a left display intended to be seen from the left of the base panel and the right sub-displays in their entirety form a right display intended to be seen from the right of the base panel.

12 Claims, 2 Drawing Sheets

TRIPLE SIGNS

TECHNICAL FIELD

The present invention relates to devices for presenting images, designs, photographs or the like, for example display panels, in particular for advertising or for public notices, boards or the like.

BACKGROUND ART

The prior art has already disclosed boards or display panels that comprise a base panel on which is presented a first design, pattern, photograph or the like and a plurality of lamellas, parallel to one another, protruding substantially vertically from the base panel and exhibiting on each of their two opposing sides sub-designs, sub-patterns or the like, the sub-designs shown on the left faces of the lamellas together forming a second design, pattern, photograph or the like that can be seen if one is positioned to the left of the board, and the sub-designs shown on the right faces of the lamellas together forming a third design, pattern, photograph or the like that can be seen if one is positioned to the right of the board. Thus, these devices make it possible to present, if one so wishes, three different displays, one seen from the left, one seen from head on, and the other seen from the right. If one so wishes, one can also show the same display from the three orientations so as to thus present a same design, pattern, photograph or the like with a field of vision from which it can be seen or contemplated which is increased in comparison to a simple, classic display.

Triple displays of this type are already known from the prior art. The lamellas are produced here by cutting a front sheet adhered to a rear sheet on their respective periphery, the parts which are thus cut forming sections intended to be pivoted and folded so as to form the lamellas coming from the central panel formed by the rear sheet. These triple displays from the prior art have a number of disadvantages. Their production is laborious since they can only be made manually, in particular due to the task of folding the section along a folding line. Furthermore, the visibility of the three displays is not good.

DISCLOSURE OF THE INVENTION

The aim of the present invention is to overcome the disadvantages of the prior art by making available a device that forms a triple display that is easy to produce and of which the three displays, intended to be seen respectively from the left, the right and from head on, exhibit a high level of clarity.

According to the invention, the device for presenting an image forming a triple display is measured by the appended claims and not by the details of the specification.

By thus making provision for the lamellas to cross the front plate, in particular until they abut the rear plate, one greatly improves the clarity and the visibility of the displays, the lamellas no longer being held on the base panel by a folding line, as in the prior art, but being blocked on either side by the front plate, and this prevents any movement due, for example, to bad weather (wind, rain), the effect of which in the prior art devices was to shift some of the lamellas in relation to the others, thus having a detrimental effect upon the clarity and visibility of the displays. Furthermore, production of the presentation device forming a triple display is simplified and so is sped up because it is now sufficient to push in the lamellas, in particular by abutting them with the rear plate, without having to perform the complicated steps of cutting, folding and turning back sections, as in the prior art.

According to one preferred embodiment of the invention, the lamellas have a thickness of between 0.1 and 3 mm, in particular of between 0.5 and 2 mm, for example of 1 mm.

BRIEF DESCRIPTION OF THE DRAWINGS

As an example, a preferred embodiment of the invention will now be described by referring to the drawings in which.

PREFERRED EMBODIMENT FOR CARRYING OUT THE INVENTION

A base panel 1 is made up of a laminate formed by a front plate 2, comprising a sheet made of PVC or some other similar material, in particular thermoplastic, a layer 3 and a rear or bottom plate 4, also made of a sheet of PVC or some other similar material. The two PVC sheets are fixed by adhesion, thermal lamination, welding or the like to the respectively upper and lower faces of the layer of foam.

Figure 1:
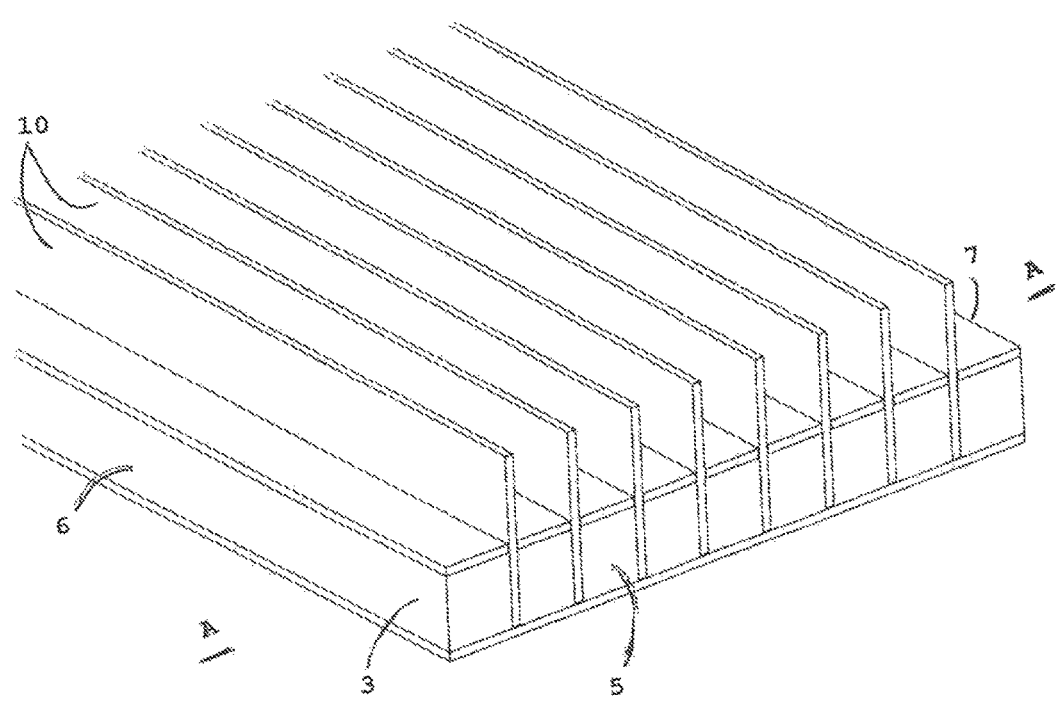
FIG. 1 is a perspective view of one embodiment of a triple display according to the invention.
Figure 2:
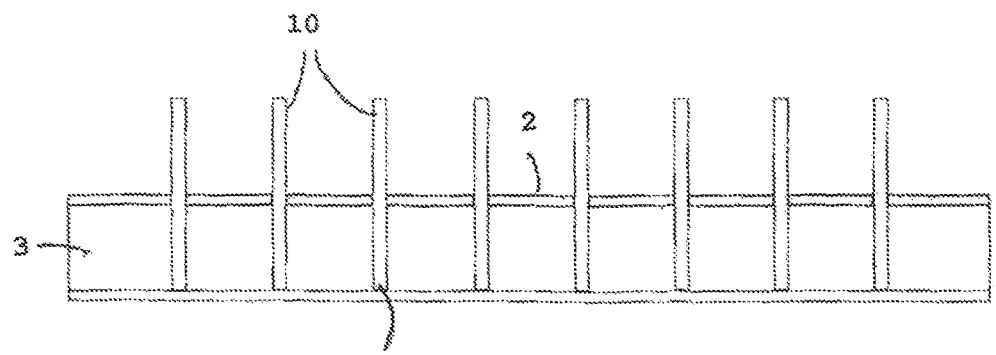
FIG. 2 is a cross-sectional view according to line A-A of the triple display of FIG. 1.
Figure 3:
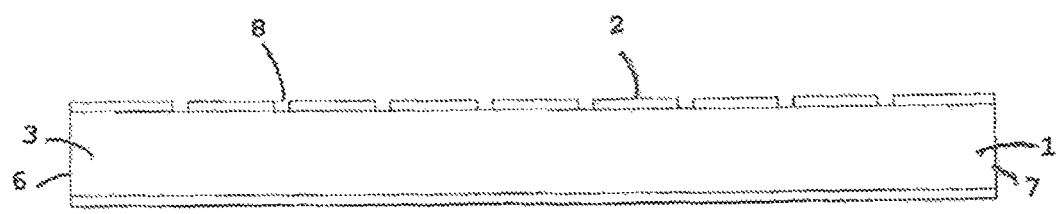
FIG. 3 is a cross-sectional view according to line A-A of the base panel of the triple display of FIGS. 1 and 2.
Figure 4:
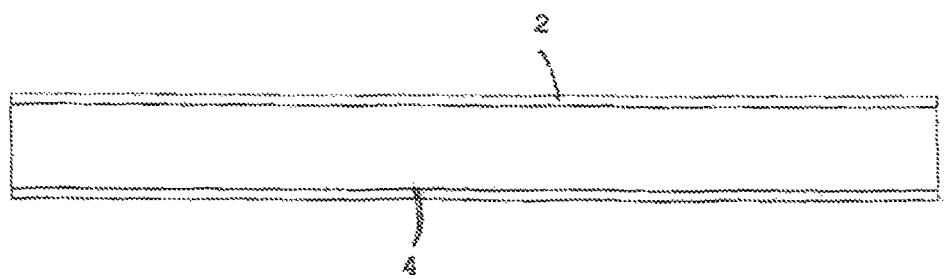
FIG. 4 is a cross-sectional view according to line A-A of the central panel of the triple display of FIGS. 1 and 2 before the formation of the vertical slits.

The front plate 2 is intended to be positioned vertically or substantially vertically when carrying a display, for example in the form of a design, a painting, a photograph or the like, intended to be seen if one is facing the front plate 2. One can thus define for the base panel 1 and its constituents a respective lower edge 5, a respective upper edge opposite the lower edge 5 (this upper edge is not shown in the drawing), a left lateral edge 6, a right lateral edge 7. The front side is the upper side of FIGS. 2 to 4 and the rear or bottom side is the lower side of FIGS. 2 to 4.

Formed in the front plate 2 are vertical, rectilinear slits 8 which extend substantially over the whole height of the plate. The slits 8 cross the whole of the front plate 2 so as to expose the layer 3 of foam. These slits 8 thus have a thickness (measured perpendicularly to the plane of FIGS. 2 to 4) equal to that of the plate.

The slits 8 shown here are rectilinear. They could be of a different form, in particular curved in a circular arc, in an elliptical arc, sinusoidally or in any other form.

On the front face of the remaining parts of the front plate central sub-displays are shown which together form a central display. These sub-displays can be made in the form of designs, paintings, photographs or the like, made directly on the front plate or applied beneath, for example by adhesion. In order to produce the central display one can, for example, take a photograph that one wishes to show and cut it into strips of a width that corresponds to the distance between two successive slits, the strips are then adhered in the zones of the front face of the front plate between each slit in order to recreate the photograph that forms the final central display, each strip forming a central sub-display.

Lamellas 10, in particular made of a material that is harder than foam, for example metal, are made so as to be in the form of a rectangular plate with a thickness substantially equal to the width of the slits 8. The lamellas 10 are introduced by their rear rim or edge 11 into the slits 8 and through the layer of foam 3 until the respective edge 11 abuts the rear plate 4, in direct contact with the latter. The greater hardness of the material of the lamellas in relation to that of the foam means that when introduced, the lamellas pass through the foam. However, the foam remains in contact with the lamella on both sides and holds it vertically.

On the respectively left and right part of their faces intended to remain on the outside of the base panel after being introduced into the foam, the lamellas comprise respectively left and right sub-displays in accordance with the same principle as the central display. For example, in order to produce the display on the left or respectively on the right, a photograph that one wishes to show is taken and it is cut into strips of a width that corresponds to the width of the part of the lamellas intended to protrude to the outside of the base panel. The strips are then adhered on these left and right parts intended to protrude to the outside of the base panel of each lamella in order to recreate the photograph that forms the final left or respectively right photograph forming the display, each strip forming a left, or respectively right sub-display.

A preferred foam is an expanded foam made of extruded polystyrene. However, one could consider other foams, in particular foams made of expanded polystyrene, whether they be open cell or closed cell foams.

The two sheets are preferably made of PVC. However, they can be made of any other material, in particular any classic canvases for forming designs or for painting.

Lamellas have been shown that all have the same height outside the base panel. Different heights could be provided.

What is claimed is:

1. A device for presenting an image forming a triple display, comprising a base panel (1) made up of a rear or bottom plate (4) and a front plate (2) on which a central display is shown intended to be seen from head on to the base panel; and a plurality of lamellas (10) protruding from the front plate (2) and spaced apart from one another, each lamella (10) carrying on a left face a respective left sub-display and on a right face a respective right sub-display such that the left sub-displays in their entirety form a left display intended to be seen from the left of the base panel and the right sub-displays in their entirety form a right display intended to be seen from the right of the base panel, characterized in that each lamella (10) penetrates with its rear edge (11) into the base panel (1) by crossing the front plate (2) such that no part of the front plate (2) is interposed between the rear edge of each lamella (10) and the rear plate (4).

2. The device according to claim 1, characterized in that each lamella abuts the rear plate (4) with its rear edge.

3. The device according to claim 1, characterized in that a layer (3) of foam through which the lamellas pass, is disposed in the base panel between the two front and rear plates (2, 4).

4. The device according to claim 3 wherein the layer (3) is made of extruded polystyrene.

5. The device according to claim 1, characterized in that the front plate (2) is a sheet of PVC.

6. The device according to claim 1, characterized in that the central display is made in the form of a plurality of central sub-displays disposed next to one another leaving a respective gap between two consecutive sub-displays, said respective gaps being where the lamellas pass through the front plate (2).

7. The device according to claim 6, characterized in that longitudinal slits are formed in the gaps defined in the front plate each lamella passing in a force fitted, tight manner through a respective slit.

8. The device according to claim 7 wherein the slits are formed over the whole width of the gaps.

9. The device according to claim 1, characterized in that each lamella is vertical.

10. The device according to claim 9 wherein each lamella has a rectilinear section.

11. The device according to claim 1, characterized in that the lamellas are curved while remaining equidistant from one another.

12. The device according to claim 1, characterized in that the lamellas have a thickness of 0.5 mm to 2.0 mm.

\* \* \* \* \*